UNITED STATES PATENT OFFICE

AUSTIN G. DAY, OF NEW YORK, N. Y.

IMPROVEMENT IN COMPOUNDS FOR THE MANUFACTURE OF KERITE.

Specification forming part of Letters Patent No. 210,406, dated December 3, 1878; application filed March 8, 1877.

CASE E.

*To all whom it may concern:*

Be it known that I, AUSTIN G. DAY, of the city, county, and State of New York, have invented an improvement in the process of making the kerite products patented by me in other Letters Patent of the United States, of even date herewith; and I hereby declare that the following is a full, clear, and exact description thereof.

In carrying out the method of working set forth in these other Letters Patent it is frequently desirable, in combining the ingredients or in producing the sulphurization, to considerably raise the temperatures or prolong the heating-times, in order to prevent the compound from becoming tacky or sticky, and when this is done it may sometimes, before the treatment is finished, have the effect, to a greater or less extent, of driving off the light oils, upon which I largely rely to impart to the product many of its important qualities. Should this occur to too large a degree, the compound is liable to become more or less dry and "short" or brittle, and to be rendered incapable of being properly mixed with india-rubber to form my kerite products.

I have found that this evil may be wholly, or almost wholly, remedied by combining with the vegetable or mineral oils, resinous bodies, and sulphur, while they are undergoing treatment to form the kerite compounds, a suitable absorbent, such as clay or equivalent earths. These absorbents not only appear to take up the resinous elements of the vegetable or mineral oils, and prevent them from aiding in making the compound tacky or sticky, but they also especially seem to act to retain in the mixture the light oils, so that the dryness or brittleness of the compound is obviated.

To enable others to make use of my improvement, I will describe the mode in which it may be put in practice.

No material change need be made in the solutions or in the proportions of any of the ingredients employed for the various products referred to in either of my other Letters Patent, and my present improvement may be applied with advantage to any of my other processes.

A successful result may be obtained with twenty-seven pounds of cotton-seed oil, thirty pounds of coal-tar, twenty-seven pounds of linseed-oil, fifteen to eighteen pounds of sulphur, and about five pounds of clay or other equivalent earth. The cotton-seed oil, the coal-tar, and the clay are first mixed together in a suitable separate vessel, and heated up to about 300° Fahrenheit, or higher, until they are thoroughly united together. The mixture may next be strained and cooled down to about 200° Fahrenheit. I then proceed in the manner described in my other Letters Patent—that is to say, when the temperature is at about 200° I put in the linseed-oil and gradually raise the heat; and when it is at about 220°, and the materials are in a homogeneous condition, I introduce the sulphur, and continue to carry up the temperature until sulphurization takes place. The compound is then cooled, and may be used for all the purposes for which I employ the products made by the modes of treatment described in my other Letters Patent.

As in the case of these other processes, the addition to the mixture of a small quantity, say about one and one-half ounce, of acid, preferably nitric, when the temperature is at about 240°, and of about one ounce of camphor, or, if desired, from an ounce to three ounces, when it is at about 270° to 280°, will be attended with beneficial results, and therefore, while they are not essential, I recommend their use.

I do not confine myself to any of the proportions herein stated, for they may all admit of wide variation without departing from my invention; nor is any particular kind of clay essential, as any variety of it or any other equivalent absorbent earth will answer the purpose.

I am well aware that clay and other analogous substances have been used in many of the mixtures employed by the manufacturers of natural india-rubber articles; but when so used it has been for a very different object and in a very different manner. I do not, therefore, make any claim to the employment of these materials for any such purpose; but, Having thus made known my invention, what I claim, and desire to secure by Letters Patent, is—

In the process of making crude kerite compounds, the within-described special improvement, consisting in combining clay or other equivalent earths with the vegetable or mineral oils, the resinous body or bodies, and sulphur, substantially in the manner and for the purposes set forth.

AUSTIN G. DAY.

Witnesses:
  A. J. DE LACY,
  JOHN J. DIXON.